(12) United States Patent
Fubuki et al.

(10) Patent No.: US 8,250,734 B2
(45) Date of Patent: Aug. 28, 2012

(54) INSERTION OF PRE-FABRICATED CONCENTRATED WINDINGS INTO STATOR SLOTS

(75) Inventors: Shingo Fubuki, Toyota (JP); Kenji Harada, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 425 days.

(21) Appl. No.: 12/530,092

(22) PCT Filed: Feb. 25, 2008

(86) PCT No.: PCT/JP2008/053716
§ 371 (c)(1),
(2), (4) Date: Sep. 4, 2009

(87) PCT Pub. No.: WO2008/108317
PCT Pub. Date: Sep. 12, 2008

(65) Prior Publication Data
US 2010/0066198 A1   Mar. 18, 2010

(30) Foreign Application Priority Data

Mar. 6, 2007 (JP) .................... 2007-056092

(51) Int. Cl.
*H02K 15/00* (2006.01)

(52) U.S. Cl. ............... 29/596; 29/598; 29/605; 29/606

(58) Field of Classification Search .................... 29/596, 29/598, 605, 606, 609; 310/208, 216.071, 310/216.072
See application file for complete search history.

(56) References Cited

U.S. PATENT DOCUMENTS 6,218,758 B1   4/2001   Miura et al.
6,229,241 B1   5/2001   Ishigami et al.

FOREIGN PATENT DOCUMENTS

| EP | 0 891 030 A | 1/1999 |
|---|---|---|
| JP | 10-271733 | 10/1998 |
| JP | 10-322992 | 12/1998 |
| JP | 11-032457 A | 2/1999 |
| JP | 2006-166610 A | 6/2006 |
| JP | 2007-221913 * | 8/2007 |

OTHER PUBLICATIONS

Office Action issued in Chinese Patent Application No. 2011070500627180 and English translation thereof.

* cited by examiner

*Primary Examiner* — Thiem Phan
(74) *Attorney, Agent, or Firm* — Kenyon & Kenyon LLP (57) ABSTRACT

A method for manufacturing a motor stator including individually mounting second and third coils on second and third teeth that are located on both sides of a first tooth, deforming a first coil with an air core before it is mounted on the first tooth, and inserting a first part of the deformed coil into a slot on one side of the first tooth, and inserting a second part of the deformed coil into the slot on the other side of the first tooth.

3 Claims, 9 Drawing Sheets

INSERTION OF PRE-FABRICATED CONCENTRATED WINDINGS INTO STATOR SLOTS

This is a 371 national phase application of PCT/JP2008/053716 filed 25 Feb. 2008, claiming priority to Japanese Patent Application No. 2007-056092 filed 6 Mar. 2007, the contents of which are incorporated herein by reference.

TECHNICAL FIELD

The present invention relates to a method of manufacturing a motor stator in which trapezoidal concentrated winding coils made of rectangular conductors set in an integral core with less limitation in the number of poles.

BACKGROUND ART

Many of stators used for motor include coils each of which is formed of a wound conductor having a circular cross-section. As the demands for an increase in efficiency and a reduction in size and weight of a motor have grown in recent years, a high space factor of a conductor in a slot of a stator has been, required.

For mounting a circular cross-section conductor on teeth of a stator core, JP 11(1999)-032457A discloses a configuration that trapezoidal coils and parallel coils are set alternately. However, this configuration requires manufacture of different shaped coils, resulting in an increase in the number of parts, thus leading to cost increase.

From a viewpoint of increasing the space factor of a conductor, on the other hand, some recent stators include coils each of which is formed of a flat rectangular conductor having a square section and is wound by edgewise bending operation. This configuration provides advantages such as an improved space factor and an excellent heat radiation characteristic as compared with a coil-wound stator.

One of techniques using coils of the same shape is disclosed in JP2006-166610A, in which equally-shaped trapezoidal coils are mounted in divided or segmented cores to increase the space factor. This technique allows manufacture of a stator from a single kind of trapezoidal coils.

DISCLOSURE OF INVENTION

Problems to be Solved by the Invention

However, the technique disclosed in JP '610A has the following disadvantages. Specifically, since the stator core is formed of a number of divided cores, a process of combining the divided cores (a process of ring shrink-fitting, etc.) is required, leading to an increase in manufacturing costs. As compared with an integral core, furthermore, the teeth are divided in correspondence with slots. Accordingly, inner-diameter accuracy (roundness and others) and outer-diameter accuracy which are important factors of a motor depend on accumulated tolerance of assembled components. Thus, the accuracy could not be ensured reliably. As a result, motor torque ripple, noise, vibration, and so on increase. The above stator if used in a motor for driving a vehicle is liable to deteriorate drivability.

It is also conceivable that divided cores provided with a plurality of teeth without individually dividing the cores for each tooth. This case would cause the disadvantage that different-shaped coils are required as with the technique disclosed in JP '457A.

The present invention has been made to solve the above problems and has a purpose to provide a method of manufacturing a motor stator capable of restraining an increase in the number of divided stator cores and allowing easy assembly of the cores.

Means for Solving the Problems

To attain the above objects, a motor stator manufacturing method and a motor stator according to the present invention have the following features.

(1) According to one aspect, the present invention provides a method of manufacturing a motor stator including: a stator core provided, in an inner surface thereof, with a plurality of slots and a plurality of teeth each radially inwardly extending and tapering toward the center of the stator core, the teeth including at least a first tooth, a second tooth, and a third tooth, and the slots and the teeth being arranged alternately; and a plurality of trapezoidal coils each of which is inserted in each slot, each coil being formed of a rectangular conductor that has a square section and is concentrated-wound into a trapezoidal shape, wherein the method comprises the steps of: individually mounting the coils on the second and third teeth located on both sides of the first tooth; deforming one of the coils with air core before it is mounted on the first tooth, and inserting a first part of the deformed coil into the slot on one side of the first tooth; and inserting a second part of the deformed coil into the slot on the other side of the first tooth.

(2) The above method (1), preferably, further comprises the steps of: mounting one of the coils on an initial one of the teeth; inserting another coil in the slots on both sides of a next tooth by sliding the coil along one side surface of the next tooth; and sequentially inserting the coils in the remaining slots but a last one.

(3) According to another aspect, the present invention provides a method of manufacturing a motor stator including: a stator core provided, in an inner surface thereof, with a plurality of slots and a plurality of teeth each radially inwardly extending and tapering toward the center of the stator core, the teeth including at least a first tooth, a second tooth, and a third tooth, and the slots and the teeth being arranged alternately; and a plurality of trapezoidal coils each of which is inserted in each slot, each coil being formed of a rectangular conductor that has a square section and is concentrated-wound into a trapezoidal shape, wherein the second and third teeth are located on both sides of the first tooth, each slot is designed so that, when one of the coils is mounted on the second tooth, a minimum distance between the third tooth and the coil mounted on the second tooth is larger than a maximum width of the coil, and the method comprises the step of sliding another coil along one side surface of the first tooth to insert the coil in the slots on both sides of the first tooth.

(4) The above method (3), preferably, further comprises the steps of: deforming one of the coils with air core before it is mounted on the last tooth; inserting a first part of the deformed coil into the slot on one side of the last tooth; and inserting a second part of the deformed coil into the slot on the other side of the last tooth.

(5) According to another aspect, the present invention provides a motor stator including: a stator core provided, in an inner surface thereof, with a plurality of slots and a plurality of teeth each radially inwardly extending and tapering toward the center of the stator core, the teeth including at least a first tooth, a second tooth, and a third tooth, and the slots and the teeth being arranged alternately; and a plurality of trapezoidal coils each of which is inserted in each slot, each coil being formed of a rectangular conductor that has a square section and is concentrated-wound into a trapezoidal shape, wherein the second and third teeth are located on both sides of the first tooth, and each slot is designed so that, when one of the coils is mounted on the second tooth, a minimum distance between the third tooth and the coil mounted on the second tooth is larger than a maximum width of the coil.

The above motor stator manufacturing method and motor stator according to the present invention can provide the following operations and effects.

According to the above configuration (1), firstly, the trapezoidal coils are mounted on the second and third teeth located on both sides of the first tooth, and then another coil is deformed with air core, a first part of the coil on one side is inserted in the slot on one side of the first tooth and then a second part of the coil on the other side is inserted in the slot on the other side of the first tooth. Accordingly, until the first part of the coil is inserted by a predetermined distance into the slot on one side of the first tooth, the second part of the coil will not contact with the first tooth and the adjacent coil having been inserted in the slot. The first part of the coil can thus be inserted smoothly in the predetermined slot. The trapezoidal coil is formed of a spirally wound rectangular conductor of plural turns, which can be deformed by shifting the turn portions sequentially like a coil spring.

When the second part of the coil comes into contact with the first tooth, the first part of the coil has already been inserted in the slot. Thus, the second part can also be inserted smoothly.

The trapezoidal coil inserted in the slot is returned to an original shape by elasticity of the rectangular conductor and is accommodated in the slot with less clearance.

According to the above configuration (3), the second and third teeth are located on both sides of the first tooth and the slot is designed so that, when the second coil is inserted in the slot, the minimum distance between the third tooth and the second trapezoidal coil is larger than the maximum width of the coil. Accordingly, even when the first trapezoidal coil is slid along one side surface of the first tooth in mounting the first coil on the first tooth, the outer peripheral edge of the bottom of the first coil closer to the first tooth will not contact with the third tooth. Thus, the first coil has only to be slid along one side surface of the first tooth, allowing smooth and easy insertion of the first coil into the slot around the first tooth.

According to the above motor stator (5), even when the first trapezoidal coil is slid along one side surface of the first tooth in mounting the first coil on the first tooth, the outer peripheral edge of the bottom of the first coil closer to the first tooth will not contact with the third tooth. Thus, the first coil has only to be slid along one side surface of the first tooth, allowing smooth and easy insertion of the first coil into the slot around the first tooth.

BEST MODE FOR CARRYING OUT THE INVENTION

Figure 9:
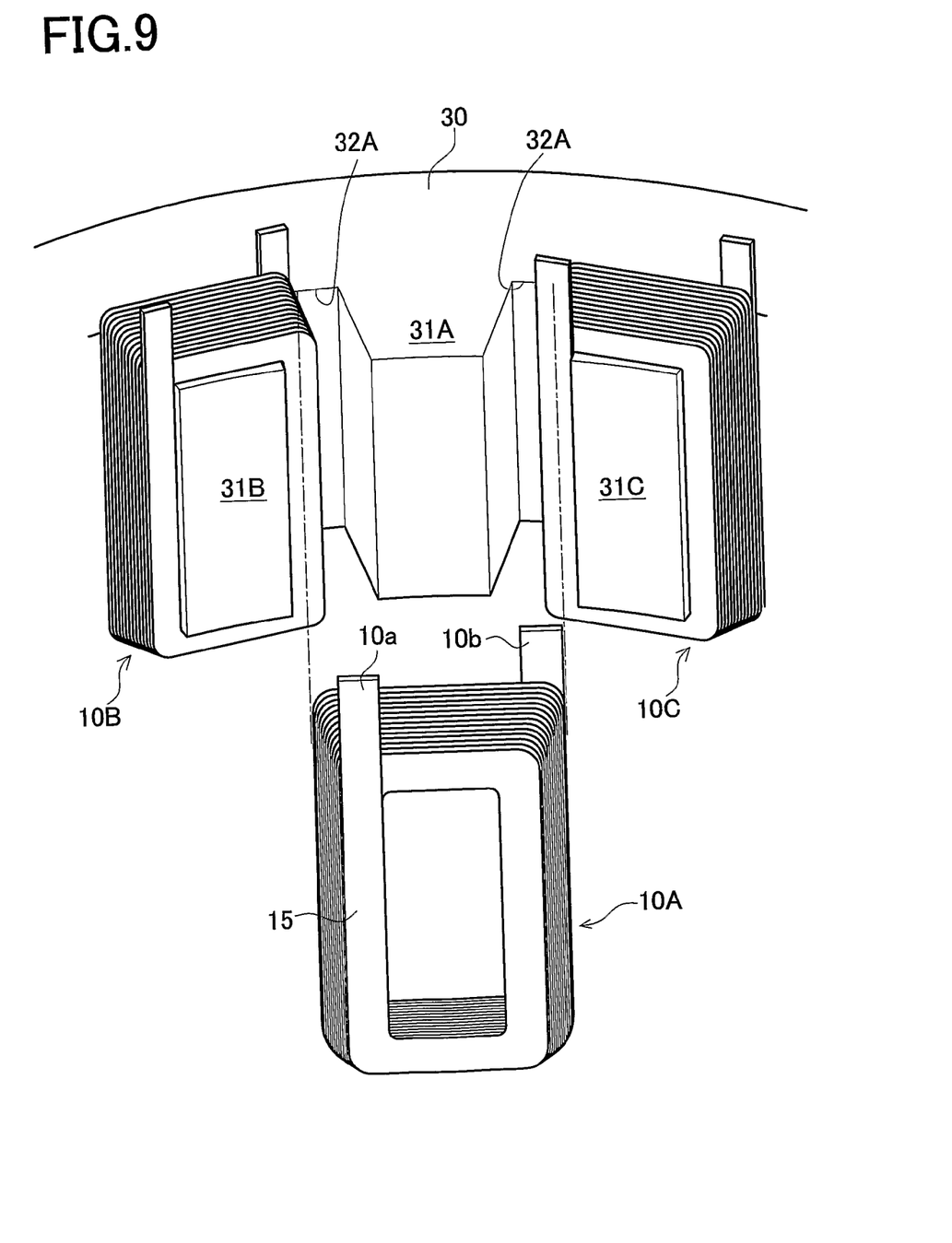
FIG. 9 is a perspective view of FIG. 3.

A detailed description of a preferred embodiment of the present invention will now be given referring to the accompanying drawings. FIG. 9 is a perspective view showing a state that a first coil 10A is to be set in a stator core 30 in the present embodiment.

Each of the first coil 10A, a second coil 10B, and a third coil 10C is made of a flat rectangular conductor 15 edgewise wound in spiral form. The conductor 15 is 1.0 mm in thickness and 5.0 mm in width in the present embodiment. Each of the coils 10A, 10B, and 10C has trapezoidal end faces along a short side and rectangular end faces along a long side. The conductor 15 is made of metal exhibiting excellent conductivity, such as copper, and coated with an insulation coating. This insulation coating is provided by enamel coating or resin coating, such as polyimide and amidimid, which ensures insulation.

A stator core 30 is constituted of annular disc-shaped laminated metal sheets and formed with teeth 31 (31A, 31B, 31C . . . ) and slots 32 arranged alternately. Each slot 32 has a space for receiving parts of two wound coils respectively mounted on adjacent two teeth 31 positioned on both sides of one slot 32. For example, one slot 32 includes a slot part 32A on one side (on the left side in FIG. 1) of the first tooth 31A and a slot part 32B on one side (on the right side in FIG. 1) of the second tooth 31B.

It is to be noted that each coil 10A, 10B, 10C . . . and each tooth 31A, 31B, 31C . . . are also hereinafter referred to as "coil 10" and "tooth 31" respectively, which are indicated in parentheses in FIG. 1.

Each tooth 31 is formed in a trapezoidal shape radially inwardly extending and tapering toward the center of the stator core 30. Each slot 32 is formed as a gap having an almost angular U-shape in plan view. Opposite walls of the adjacent teeth 31 defining one slot 32 are formed in parallel.

On each tooth 31, a resin insulator serving as an insulating material (not shown because it is thin) is fitted. One coil 10 is mounted on one tooth 31 with the insulator interposed therebetween.

Referring to FIGS. 1 to 7, an explanation is given hereinafter to steps of inserting the coils 10 in all of the slots 32 of the stator core 30. All the figures show plan views of the stator core 30. Each coil 10 is shown in section. The stator core 30, which is not divided, is of an integral columnar external shape.

Figure 1:
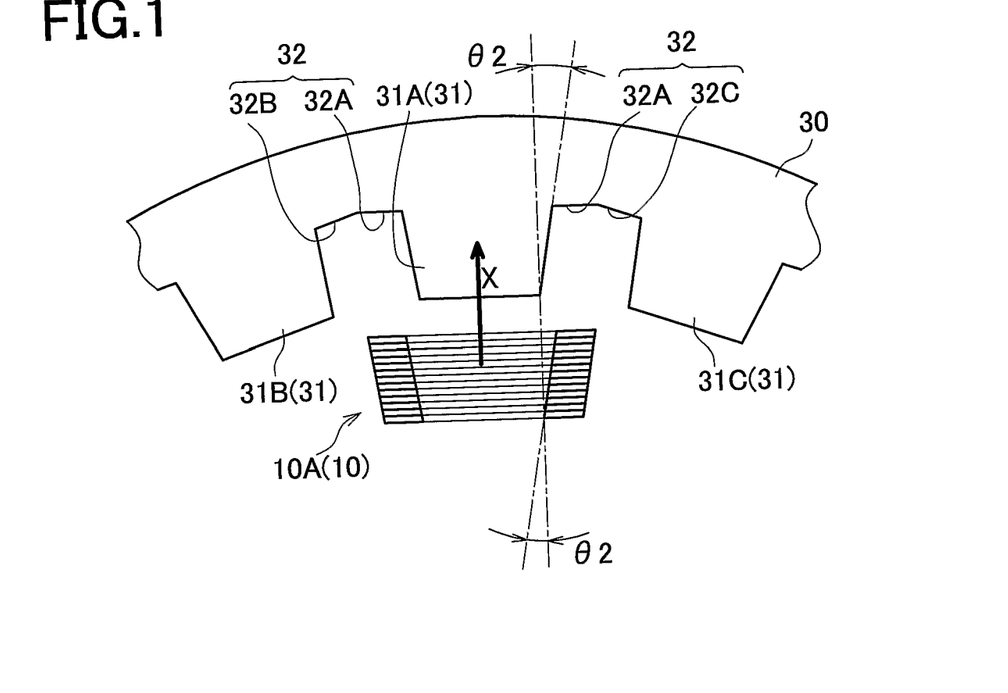
FIG. 1 is an explanatory view showing a step of inserting a first coil into a slot around a tooth.

In FIG. 1, the coil 10A is disposed in front of the first tooth 31A. The tooth 31A is of a trapezoidal shape tapering toward the center of the core 30 and thus has inclined side surfaces. A taper angle at each side (an inclination angle of each side surface) is θ2. The other teeth 31B, 31C . . . are of the same shape as the first tooth 31A.

On the other hand, the coil 10A is of an inner surface having a trapezoidal shape conforming to the trapezoidal outer shape of the tooth 31A. A taper angle of the inner surface is θ2 at each side.

When the coil 10A is moved in a direction X in FIG. 1, the coil 10A is easily inserted in the slot parts 32A formed on both sides of the tooth 31A.

Figure 2:
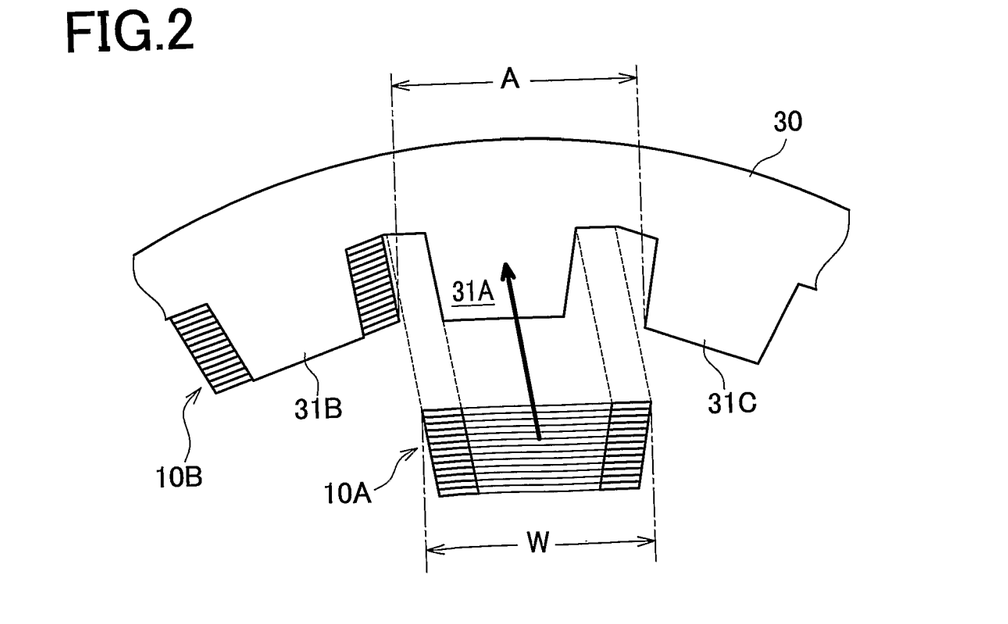
FIG. 2 is an explanatory view showing a step of inserting a second coil into a slot around another tooth.

Next, referring to FIG. 2, an explanation is given to a step of mounting the first coil 10A on the first tooth 31A after the second coil 10B has been mounted on the second tooth 31B on the left side of the first tooth 31A but before the third coil 10C is mounted on the third tooth 31C on the right side of the first tooth 31A.

The horizontal distance between a rightmost point of the second coil 10B mounted on the second tooth 31B and a leftmost point of the third tooth 31C in FIG. 2 is assumed to be "A". The bottom dimension of the first coil 10A is assumed to be "W". The teeth 31 and the slots 32 are designed to establish a relationship; A>W.

Specifically, each slot 32 is designed so that, when the second coil 10B is inserted in the slot parts 32B on both side of the second tooth 31B, which is one of teeth 31B and 31C adjacent to the first tooth 31A, the minimum distance "A" between the third tooth 31C and the second coil 10B is larger than the maximum width "W" of the coil 10. Accordingly, when the first coil 10A is slid along one side surface of the first tooth 31A, the first coil 10A is inserted in the slot parts 32A on both sides of the first tooth 31A.

Concretely, the first coil 10A is slid by making its left inner surface contact with the left side surface of the first tooth 31A. At that time, the inserting direction (angle) is defined by an angle θ2 relative to a vertical direction perpendicular to the bottom of the coil 10A. Thus, the first coil 10A can be smoothly inserted in the slot parts 32A.

The subsequent coils 10 can be sequentially inserted in the corresponding slots 32 according to the step shown in FIG. 2. The point is a step of inserting a last coil 10.

The following explanation is given to the step of inserting the last coil 10 referring to FIGS. 3 to 7.

Figure 3:
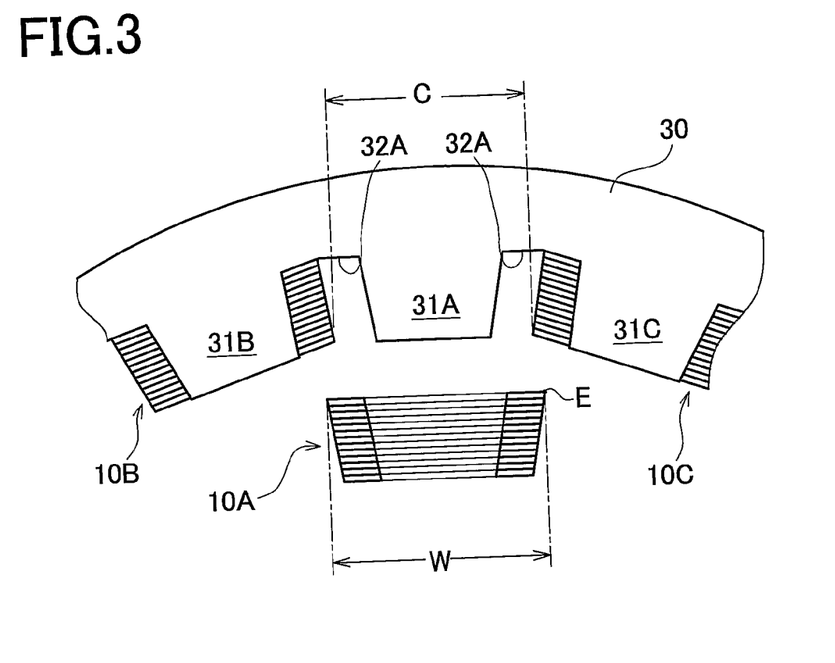
FIG. 3 is a first view to explain a step of inserting a last coil into a slot around a last tooth.

As shown in FIG. 3, the trapezoidal coil 10A is disposed with its bottom being in parallel to the top face of the trapezoidal tooth 31A. Of the inner and outer surfaces of the trapezoidal coil 10A, each long side surface is inclined at an angle of θ2 with respect to a vertical line perpendicular to the bottom. This state is also shown in FIG. 9. The second coil 10B has already been mounted on the second tooth 31B adjacent to the first tooth 31A. Similarly, the third coil 10C has already been mounted on the third tooth 31C. In this state, the maximum width W of the coil 10 is larger than the maximum width C of a space (slot parts 32A) between the second coil 10B and the third coil 10C. It is therefore impossible to directly insert the coil 10A in the slot parts 32A of the first tooth 31A.

Figure 8:
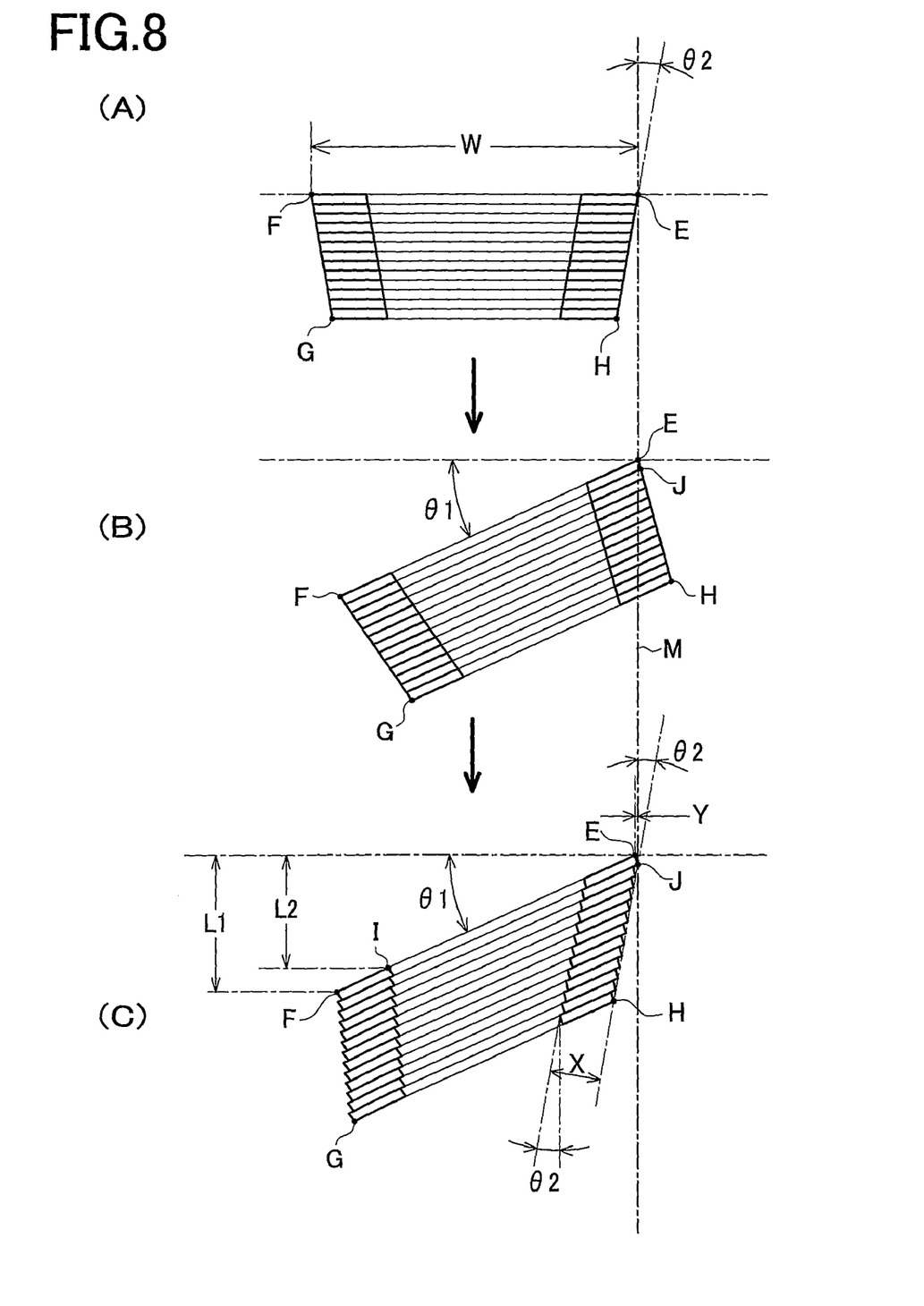
FIG. 8 is views to explain the steps of deforming the coil.

Accordingly, the first coil 10A is deformed in the following steps as shown in FIG. 8.

Figure 10:
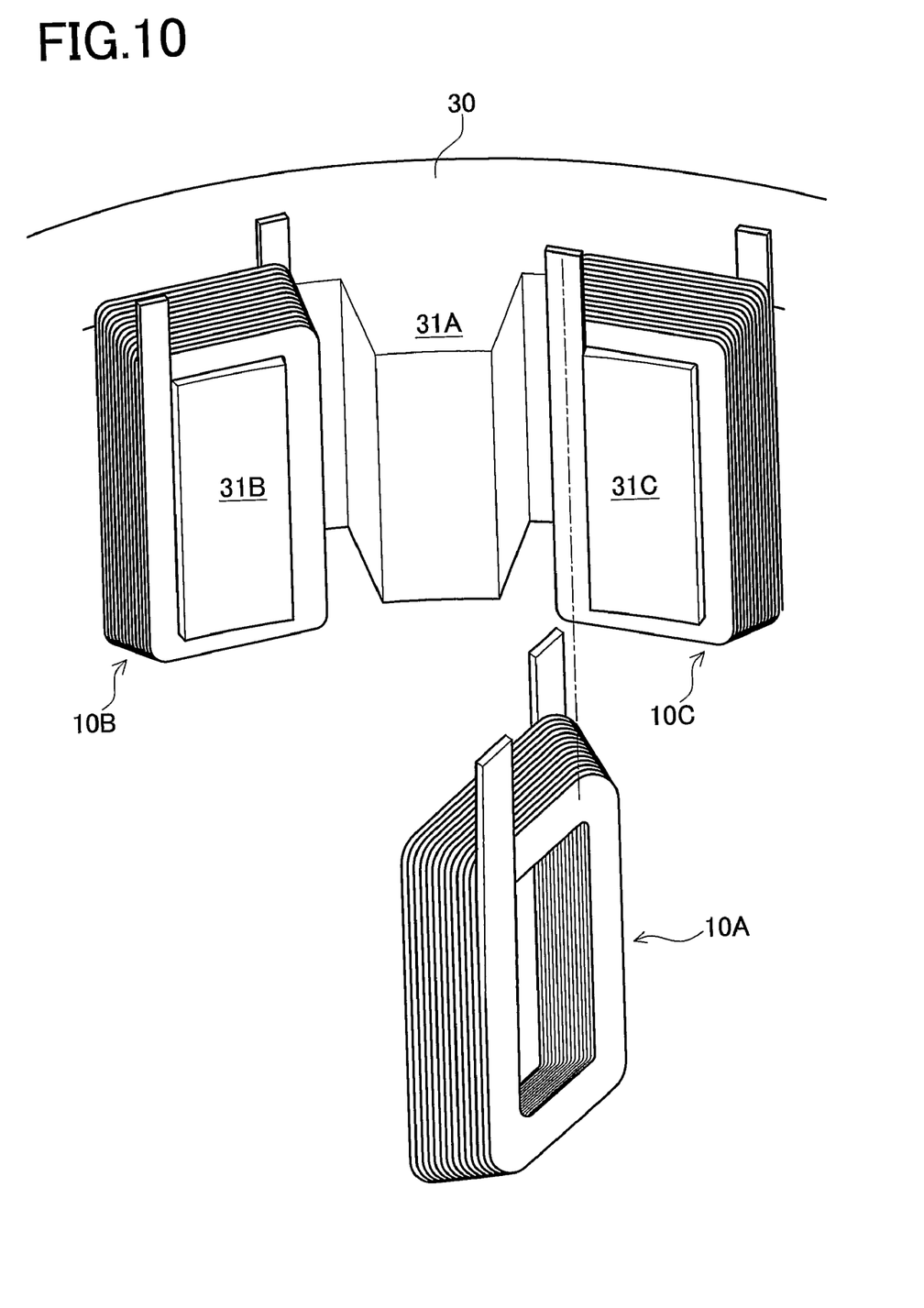
FIG. 10 is a perspective view of FIG. 4.

(1) From the state shown in FIG. 8 (A), the coil 10A wound with air core is tilted or rotated about one peripheral end (a center point E) of the bottom of the coil 10A at a predetermined angle θ1 with respect to the top face of the target first tooth 31A. The coil 10A comes to the state shown in FIG. 8 (B), in which part of the rectangular conductor 15 of the first coil 10A goes beyond the vertical line M passing the center point E. This state is also shown in FIG. 10. In a first turn portion of the rectangular conductor 15, a second corner J next to the center point (first corner) E in a thickness direction of the conductor 15 lies beyond the vertical line M passing the center point E.

(2) The second and subsequent turn portions of the conductor 15 from the bottom on the side (located on the center point E side) which are to be first inserted in the slot are slightly shifted one by one to partially overlap one another until the line passing an outermost point H of the thirteenth turn portion of the conductor 15 and the second corner J forms an angle of θ2 with respect to the vertical line M passing the center point E. Specifically, a straight line J-H forms an angle of θ2 with the vertical line M. Then, the whole coil 10A is moved leftward in FIG. 8 by a distance Y to a position where the second corner J is aligned with the vertical line M.

Figure 4:
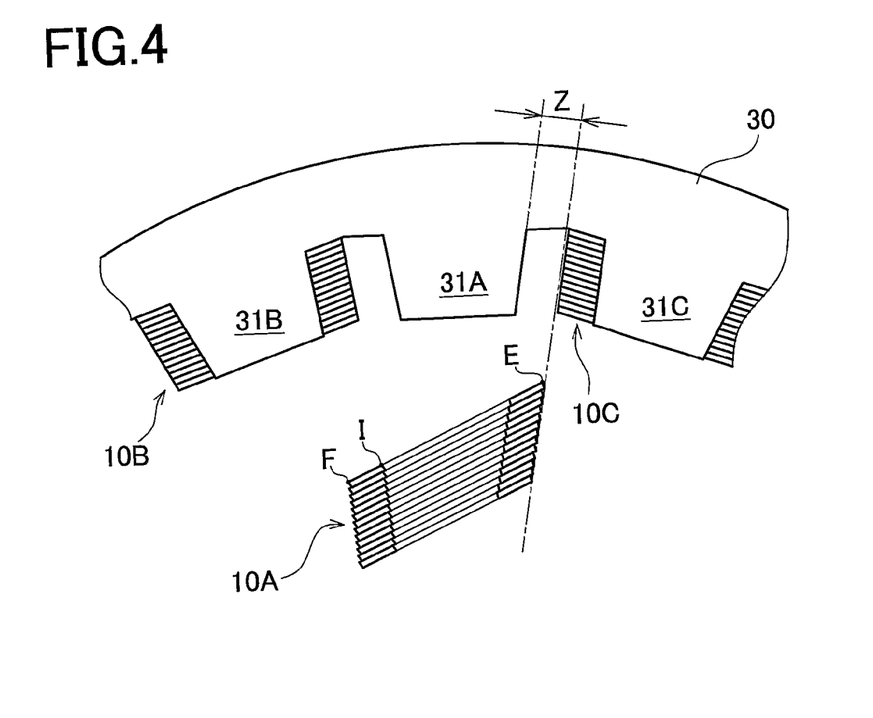
FIG. 4 is a second view to explain the step of inserting the last coil into the slot around the teeth.
Figure 11:
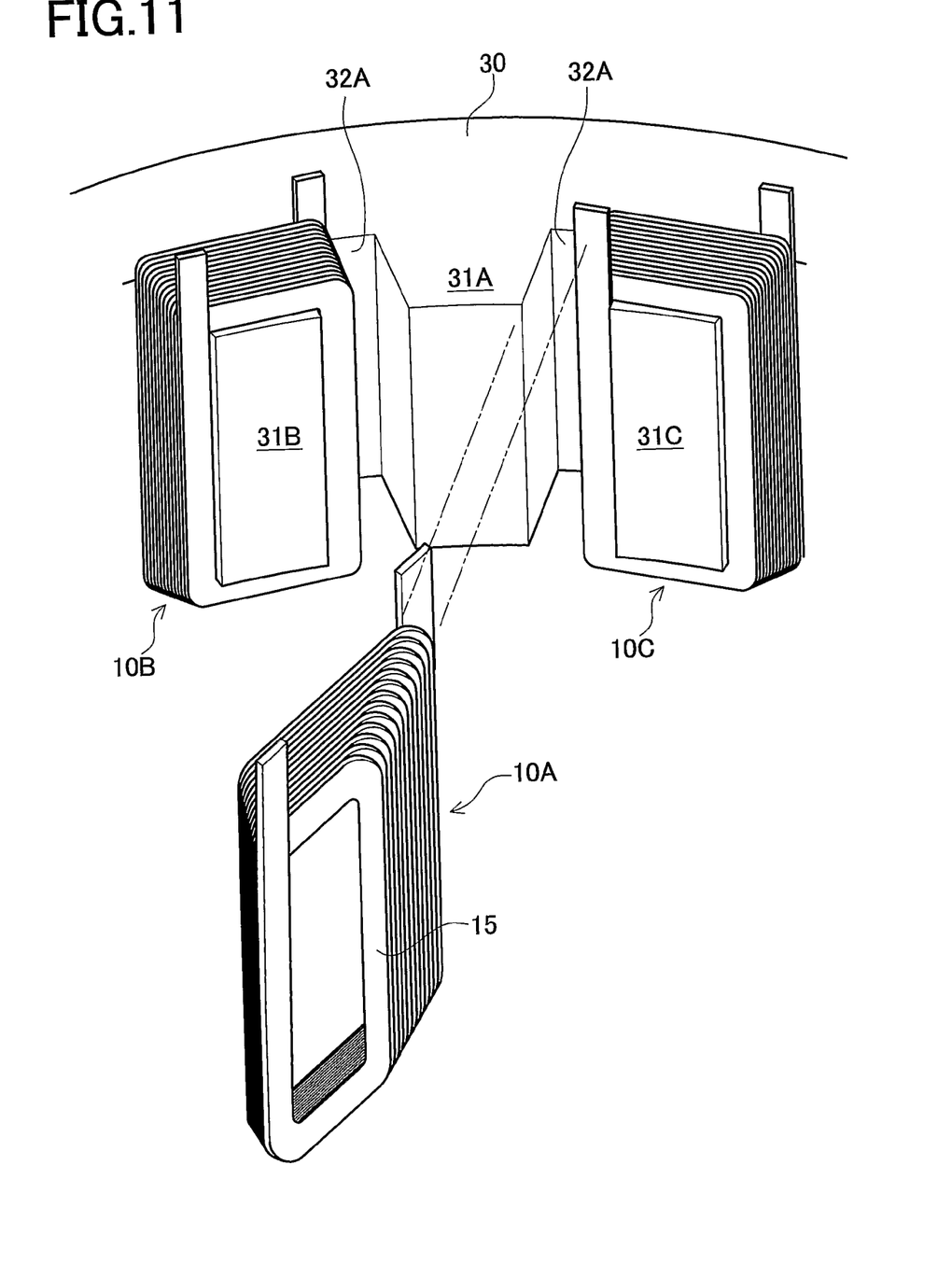
FIG. 11 is a perspective view of FIG. 5.

This state is shown in FIG. 8 (C) and also in FIG. 4. FIG. 11 is a perspective view thereof. As shown in FIG. 11, the turn portions of the rectangular conductor 15 on the side closer to the third tooth 31C are slightly shifted one by one and further the whole coil 10A is inclined at an angle of θ1. The width X (shown in FIG. 8 (C)) of the conductor 15 in that state is equal to or shorter than the width Z (see FIG. 4) of the slot part 32A closer to the third tooth 31C. Accordingly, the coil 10A is ready to be inserted along a dashed line in the figure, i.e., along the right side surface of the first tooth 31A in FIG. 4.

(3) As above, a closest point (the center point E) of the turn portions (a first part) of the conductor 15 which will be inserted first to the first tooth 31A and an outermost point F of the turn portions (a second part) of the conductor 15 which will be inserted later are spaced by a distance L1 in a direction away from the first tooth 31A. The distance between a closest point I of the turn portions (the second part) of the conductor 15 which will inserted later to the first tooth 31A and the center point E is assumed to be L2 in FIG. 8 (C).

(4) When the first coil 10A is to be mounted on the first tooth 31A, the turn portions (the second part) of the rectangular conductor 15 to be inserted later will not come into contact with the first tooth 31A and the second coil 10B having already been mounted on the second tooth 31B until the turn portions (the first part) of the conductor 15 to be inserted first are inserted by the distance L2. Accordingly, the conductor 15 can be inserted smoothly in the slot part 32A of the first tooth 31A.

Figure 5:
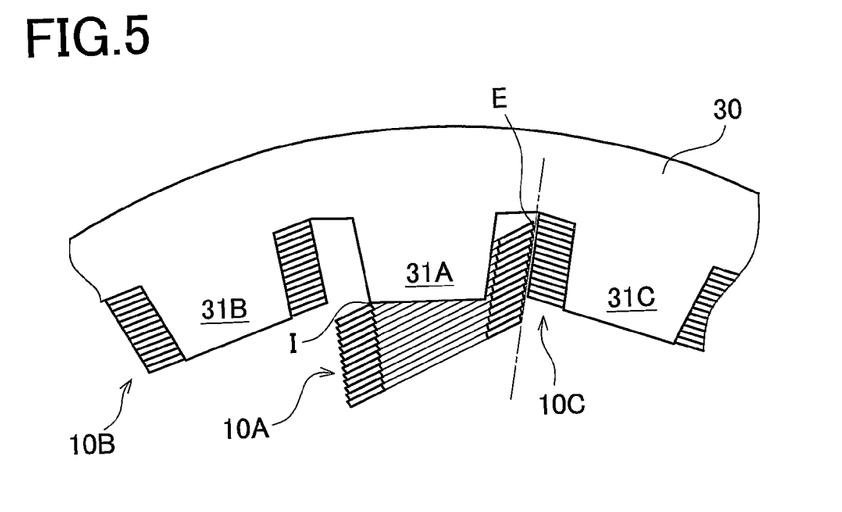
FIG. 5 is a third view to explain the step of inserting the last coil into the slot around the teeth.
Figure 6:
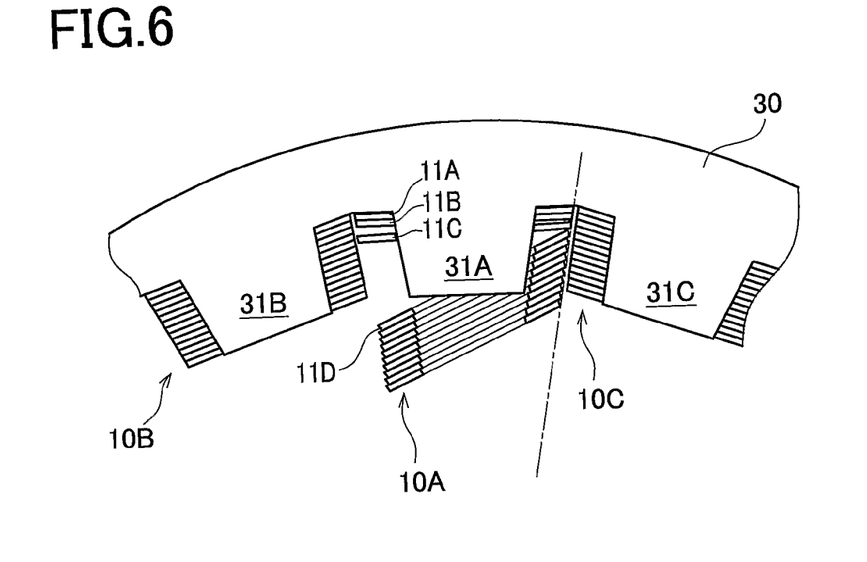
FIG. 6 is a fourth view to explain the step of inserting the last coil into the slot around the teeth.
Figure 7:
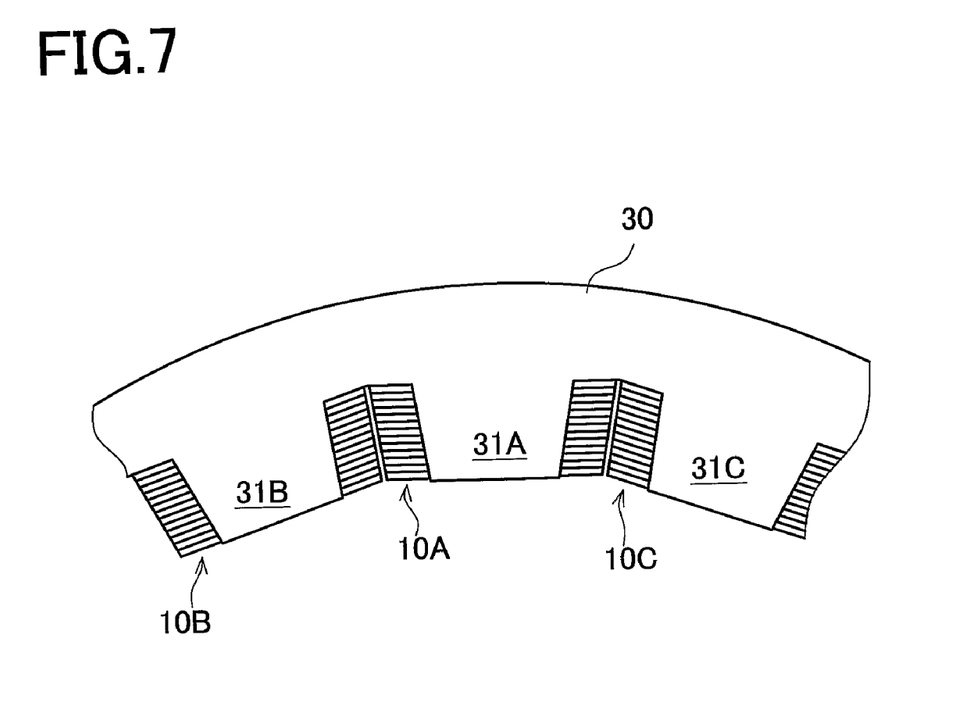
FIG. 7 is a fifth view to explain the step of inserting the last coil into the slot around the teeth.

(5) As shown in FIG. 5, after most of the turn portions (right turn portions in the figure) of the coil 10A have already been inserted in the slot part 32A on one side of the tooth 31A, the point I of the turn portion (left turn portion in the figure) of the first coil 10A closer to the first tooth 31A comes into contact with the tooth 31A. Accordingly, the left turn portions are also smoothly inserted in the slot part 32A on the other side of the tooth 31A. In other words, the left turn portions are shifted obliquely with respect to the slot part 32A, providing a narrower width in appearance, thus allowing smooth insertion in the slot part 32A. In the present embodiment, thirteen turn portions of the conductor 15 are sequentially inserted one by one smoothly in either slot part 32A as shown in FIG. 6.

Figure 12:
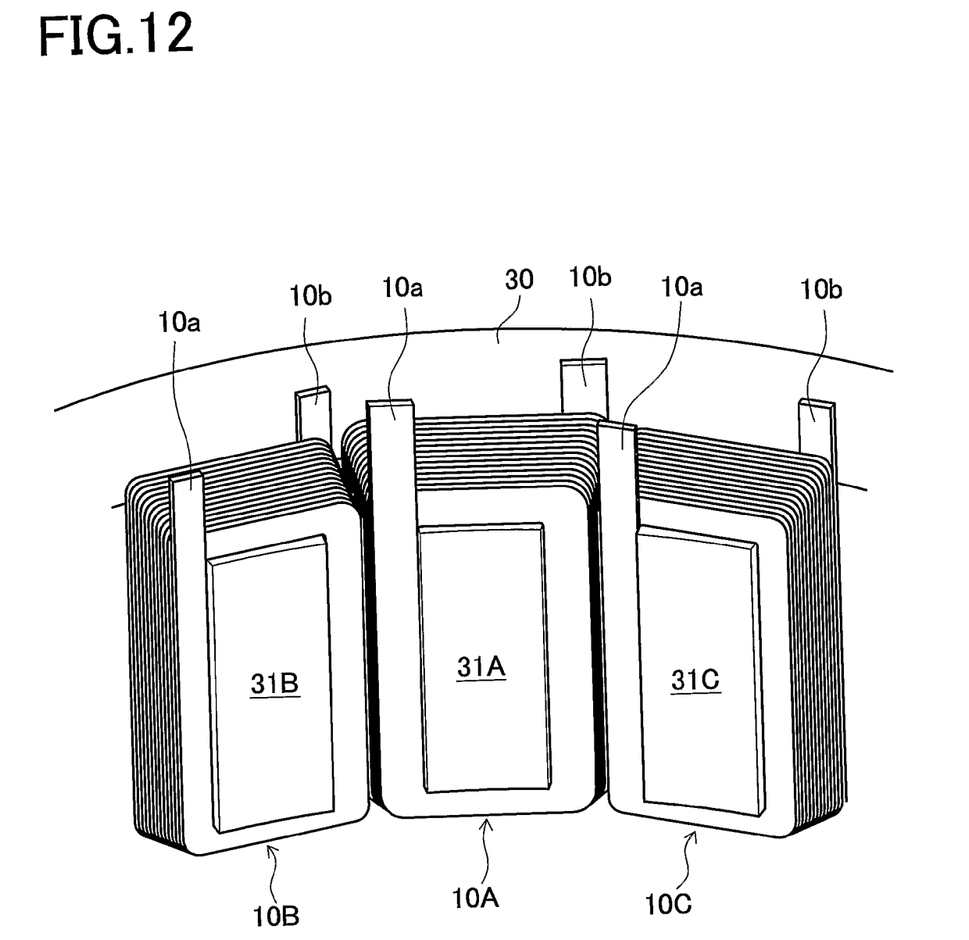
FIG. 12 is a perspective view of FIG. 7.

The first coil 10A inserted in the slot parts 32A is returned to an original shape by its elasticity and accommodated with little clearance in the slot parts 32A. This state is shown in plan view of FIG. 7 and also in perspective view of FIG. 12.

As above, all of the coils 10 are inserted in the stator core 30 and then selectively connected with connection wires to provide a U phase, a V phase, and a W phase. Specifically, each coil 10 is formed with coil end portions 10a and 10b to which the connection wires are joined to form the U phase, V phase, and W phase, respectively. A U-phase terminal, a V-phase terminal, and a W-phase terminal are then connected. Finally, a resin-molded part is formed at the end of the stator core 30 to complete a stator.

As explained above in detail, the manufacturing method of the motor stator in the present embodiment is directed to the stator core 30 provided, in the inner surface thereof, with a plurality of slots 32 and a plurality of teeth 31 each tapering toward the center of the stator core 30; and a plurality of coils 10 individually mounted on the teeth 31, each coil being formed of the rectangular conductor 15 having a square section and concentrated-wound in a trapezoidal shape. According to this method, the second coil 10B and the third coil 10C are individually inserted in the slots 32B and 32C on the sides of the second and third teeth 31B and 31C located on both sides of the first tooth 31A, and then the first coil 10A is deformed with air core, a first part of the first coil 10A on one side is inserted in the slot part 32A on one side of the first tooth 31A, and then a second part of the first coil 10A is inserted in the other slot part 32A on the other side of the first tooth 31A. Accordingly, until the first part of the first coil 10A is inserted by a predetermined distance into the slot part 32A on one side of the first tooth 31A, the second part of the first coil 10A will not contact with the first tooth 31A and the adjacent second coil 10B having been inserted in the slot part 32B. Consequently, the first part of the coil 10A can be inserted in the target slot part 32A smoothly.

Further, at the time when the end point I of the second part of the first coil 10A comes into contact with the first tooth 31A, the first part of the coil 10A has already nearly been inserted in the slot part 32A. Accordingly, the second part of the coil 10A can be inserted in the other slot part 32A smoothly. The first coil 10A completely inserted in the slot parts 32A is returned to the original shape by elasticity of the rectangular conductor 15 and is accommodated in the slot parts 32A with less clearance.

According to the manufacturing method of the motor stator in the above embodiment, the slot 32 is designed so that, when the second coil 10B is inserted in the slot parts 32B around the second tooth 31B, of the second and third teeth 31B and 31C located on both sides of the first tooth 31A, the minimum distance A between the third tooth 31C and the second coil 10B is larger than the maximum width W of the coil 10. Even when the first part of the first coil 10A is slid along one side surface of the first tooth 31A in mounting the first coil 10A on the first tooth 31A, the outer peripheral end of the bottom of the first part of the coil 10A closer to the first tooth 31A will not contact with the third tooth 31C. Thus, the first coil 10A has only to be slid along one side surface of the first tooth 31A, allowing smooth and easy insertion of the first coil 10A into the slot parts 32A on both sides of the first tooth 31A.

The insertion method of the coil 10 into the slot 32 explained referring to FIG. 2 can be applied not only to the stator core 30 of an integral type used in the above embodiment but also to a stator core manufactured by assembling a plurality of divided cores each of which has e.g. three or four teeth and setting the assembly in a heated and expanded ring, that is, a so-called shrink fitting method.

Specifically, the coil 10 is mounted on an endmost tooth of three or four teeth 31 of one divided core according to the method shown in FIG. 1 and the coils 10 are sequentially mounted on the adjacent teeth according to the method shown in FIG. 2. Thus, three or four coils 10 can be easily mounted in the divided core to be assembled.

Further, the insertion method of the coil 10 into the slot 32 explained referring to FIG. 2 may be applied not only to the stator core 30 of an integral type used in the above embodiment but also to a combination of a divided stator core having plural teeth but lacking one tooth and another divided stator core having only one tooth. The stator core lacking one tooth and the stator core having one tooth are assembled and set in a heated and expanded ring to produce a complete stator core by the so-called shrink fitting technique.

In other words, the coil 10 is mounted on an endmost tooth 31 of the divided stator core lacking one tooth according to the method shown in FIG. 1, and the other coils 10 are sequentially mounted on the adjacent and subsequent teeth 31 according to the method shown in FIG. 2 so that the coils 10 are individually mounted on the remaining teeth 31. Then, the coil 10 is mounted on the other stator core having only one tooth 31 according to the method shown in FIG. 1.

The present invention may be embodied in other specific forms without departing from the essential characteristics thereof.

For instance, in the above embodiment, the coil 10 is deformed to follow the steps (A), (B), and (C) in FIG. 8. Alternatively, the coil 10 may be deformed first in the step (C) in FIG. 8 and then the step (B).

In the above embodiment, the tilting amount of the conductor 15 in the step (B) is $\theta 1$. This amount may be larger. As the tilting amount is larger, the distance L2 can be increased and the width X of the conductor 15 can be decreased.

The invention claimed is:

1. A method of manufacturing a motor stator including:
   a stator core provided, in an inner surface thereof, with a plurality of slots and a plurality of teeth each radially inwardly extending and tapering toward the center of the stator core, the teeth including at least a first tooth, a second tooth, and a third tooth, and the slots and the teeth being arranged alternately; and
   a plurality of trapezoidal coils having the same shape, each of which is inserted in each slot, each coil being formed of a rectangular conductor that has a rectangular cross-section and is concentrated-wound into a trapezoidal shape,
   wherein the method comprises:
   individually mounting the coils on the second and third teeth located on both sides of the first tooth;
   elastically deforming one of the coils having an air core before it is mounted on the first tooth, and inserting a first part of the elastically deformed coil into the slot on one side of the first tooth; and
   inserting a second part of the elastically deformed coil into the slot on the other side of the first tooth while returning to an original shape by its elasticity resulting from elastic deformation.

2. The method of manufacturing the motor stator according to claim 1 further comprising:
   mounting one of the coils on an initial one of the teeth;
   inserting another coil in the slots on both sides of a next tooth by sliding the coil along one side surface of the next tooth; and
   sequentially inserting the coils in the remaining slots but a last one.

3. The method of manufacturing the motor stator according to claim 1 further comprising:
   elastically deforming the flat rectangular conductor of the trapezoidal coil obliquely to provide a narrower width of the rectangular conductor in a direction of inserting the coil into the slot.

* * * * *